United States Patent [19]

Hamada et al.

[11] Patent Number: 4,971,175

[45] Date of Patent: Nov. 20, 1990

[54] STEERING SYSTEM FOR VEHICLES

[75] Inventors: Tetsuro Hamada, Tochigi; Shoichi Sano, Tokyo; Yoshimi Furukawa, Tochigi, all of Japan

[73] Assignee: Honda Giken Kogyo Kabushiki Kaisha, Tokyo, Japan

[21] Appl. No.: 684,613

[22] Filed: Dec. 21, 1984

[30] Foreign Application Priority Data

Dec. 23, 1983 [JP] Japan .................. 58-243354
Dec. 23, 1983 [JP] Japan .................. 58-243355

[51] Int. Cl.⁵ .......................................... B62D 5/06
[52] U.S. Cl. .................................. 180/140; 180/142
[58] Field of Search ............... 180/140, 141, 142, 234, 180/236; 364/424

[56] References Cited

U.S. PATENT DOCUMENTS

| 4,372,407 | 2/1983 | McColl | 180/140 X |
| 4,373,603 | 2/1983 | Nelson | 180/140 X |
| 4,412,594 | 11/1983 | Furukawa et al. | 180/142 X |
| 4,473,128 | 9/1984 | Nakayama et al. | 180/142 |

FOREIGN PATENT DOCUMENTS 53-40929  4/1978  Japan .................. 180/140

Primary Examiner—Mitchell J. Hill
Attorney, Agent, or Firm—Irving M. Weiner; Joseph P. Carrier; Pamela S. Burt

[57] ABSTRACT

A steering system (1) for vehicles including a front wheel steering mechanism (1a) for steering front wheels (5) at an angle in accordance with a steering operation of a driver, and a rear wheel steering mechanism (1b) for steering rear wheels (11) at an angle (Sr) in accordance with a travelling state of the vehicle. For the steering of the rear wheel, a reference steering angle (Ar) according to a turning state of the vehicle and a corrective steering angle (Ac) according to a velocity derivative thereof are computed, and the steering angle (Sr) of the rear wheel is obtained by making either an addition or a subtraction of the reference and corrective steering angles at least in accordance with the velocity derivative.

4 Claims, 3 Drawing Sheets

STEERING SYSTEM FOR VEHICLES

Background of the Invention

1. Field of the Invention

The present invention relates generally to a steering system for vehicles. More particularly, the invention relates to a steering system for a vehicle with a front wheel and a rear wheel, of the type which includes a front wheel steering mechanism for steering the front wheel according to a steering operation of a driver and a rear wheel steering mechanism for steering the rear wheel according to a travelling state of the vehicle.

2. Description of Relevant Art

There have already been proposed various steering systems for vehicles with front wheels and rear wheels, such as four-wheeled motor vehicles; an exemplary steering system of this type being disclosed in U.S. Pat. No. 4,412,594. Each such steering system inludes a front wheel steering mechanism for steering the front wheels at an angle in accordance with a steering operation of a driver of the vehicle and a rear wheel steering mechanism for steering the rear wheels at an angle in accordance with a travelling state of the vehicle.

By virtue of such a steering system, both the turning characteristics and the steering responsiveness of vehicles can be greatly improved.

Generally, vehicles such as four-wheeled motor vehicles have the attendant problem that, when a decelerating operation is performed while turning, especially when beginning turning, the vehicle tends to have decreased lateral forces of the rear wheels thereof, thus resulting in a fish-tailing motion or the like.

Moreover, for an accelerating operation to be performed during turning travel of such vehicles, particularly in the latter half thereof, a desideratum has developed for facilitating the accelerating operation during turning travel, such as along a blind curve.

The present invention effectively overcomes such difficulties associated with conventional steering systems for vehicles, while fulfilling the aforesaid desideratum.

Summary of the Invention

The present invention provides a steering system for a vehicle with a front wheel and a rear wheel, including a front wheel steering system for steering the front wheel at an angle in accordance with a steering operation of a driver of the vehicle and a rear wheel steering mechanism for steering the rear wheel at an angle in accordance with a travelling state of the vehicle. The steering system not only provides excellent vehicle turning characteristics and steering responsiveness but also provides control of the rear wheel so as to prevent the occurrence of a fish-tailing motion or the like, even during a decelerating operation while the vehicle is turning, as well as facilitating an accelerating operation during turning travel of the vehicle.

According to the present invention, there is provided a steering system for a vehicle with a front wheel and a rear wheel, comprising a front wheel steering mechanism for steering the front wheel at an angle in accordance with a steering operation of a driver of the vehicle, and a rear wheel steering mechanism for steering the rear wheel, the rear wheel steering mechanism having a first detection means for detecting a turning state of the vehicle, a first process means for processing a detection signal of the first detection means to provide steering data for the rear wheel corresponding to the turning state, a second detection means for detecting a velocity derivative of the vehicle, a second process means for processing a detection signal of at least the second detection means to provide correction data for the steering of the rear wheel, the correction data representing a correction quantity and a correction direction both corresponding to the velocity derivative, and an actuation means, for actuating the rear wheel at an angle in accordance with both the steering data and the correction data.

The above and further objects, details and advantages of the present invention will become apparent from the following detailed description of the preferred embodiments of the invention when read in conjunction with the accompanying drawings.

Detailed Description of Preferred Embodiments

Figure 1:
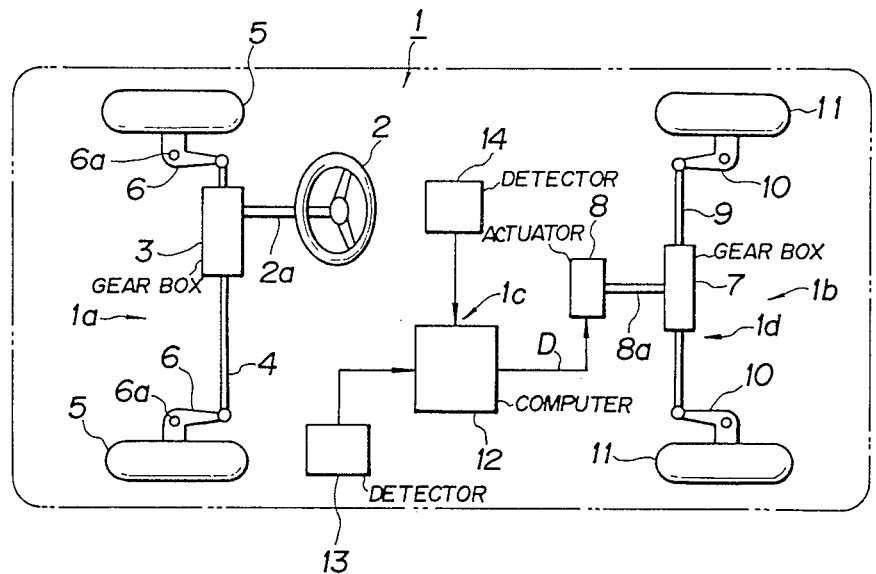
FIG. 1 is a plan view schematically showing the constitution of a steering system for vehicles according to an embodiment of the invention.

There will be described hereinbelow a preferred embodiment of the invention and a modified example thereof, with reference to the accompanying drawings, wherein like parts are designated by like reference characters.

Referring first to FIG. 1, designated at reference numeral 1 is the entirety of a steering system provided in a vehicle as shown by dashed line. The steering system 1 comprises a front wheel steering mechanism 1a for steering a pair of front wheels 5, 5 at an angle Sf in accordance with a steering operation that a driver (not shown) of the vehicle makes through a steering wheel 2, from the neutral position of FIG. 1 corresponding to a straight travelling state of the vehicle, and a rear wheel steering mechanism 1b for steering a pair of rear wheels 11, 11 at an angle Sr in accordance with a travelling of the vehicle, from the neutral position of FIG. 1 corresponding to the straight travelling state.

The steering wheel 2 for the steering operation of the driver has an angular displacement corresponding to the amount of the operation, which angular displacement is transmitted through a steering shaft 2a to a gear (not shown) such as of a rack and pinion type in a gear box 3, where it is converted into a transverse displacement of a front tie rod 4. The tie rod 4 has at both ends thereof either of a pair of front knuckle arms 6 pivotably connected thereto at one end thereof, which arms 6, 6 are pivotable about a pair of pivot points 6a, 6a, respectively. Each front wheel 5 supported by the other end of the knuckle arm 6 is therefore steerable by an angle corresponding to the transverse displacement of the tie rod 4, in the steering direction of the steering wheel 2.

On the other hand, the rear wheel steering mechanism 1b includes a control part 1c for determining the rear wheel steering angle Sr in accordance with the travelling state of the vehicle, the control part 1c outputting a control signal D, and an actuating part 1d for actuating to steer the rear wheels 11, 11 at the angle Sr, following the control signal D. More particularly, in accordance with the signal D, a servo-actuator 8 makes an angular displacement, which is transmitted through a shaft 8a to a gear (not shown) such as of a rack and pinion type in a gear box 7, where it is converted into a transverse displacement of a rear tie rod 9, whereby, through a pair of rear knuckle arms 10, 10, the rear wheels 11, 11 are caused to be steered in a manner similar to that in the front wheel steering mechanism 1a.

The control part 1c of the rear wheel steering mechanism 1b is constituted by a detection system comprising a turning state detector 13 for detecting a turning state Ts of the vehicle and a velocity derivative detector 14 for detecting a velocity derivative Vd of the vehicle, that is, an acceleration and deceleration thereof, and by a microcomputer system 12 for computing the rear wheel steering angle Sr on the basis of signals from the detection system, to output the control signal D to the actuator 8. This embodiment employs as the turning state detector 13 a lateral acceleration sensor (not shown), which may alternatively be a yawing rate sensor, and as the velocity derivative detector 14 an unshown sensor adapted to detect a derivative of the revolution speed of an axle (not shown). However, it is also contemplated that there may be employed as the turning state detector 13 any suitable element adapted for detecting the lateral acceleration or the angular velocity about the center of gravity of the vehicle, and as the velocity derivative detector 14 any suitable element adapted for detecting the acceleration and/or deceleration of the vehicle.

Figure 2:
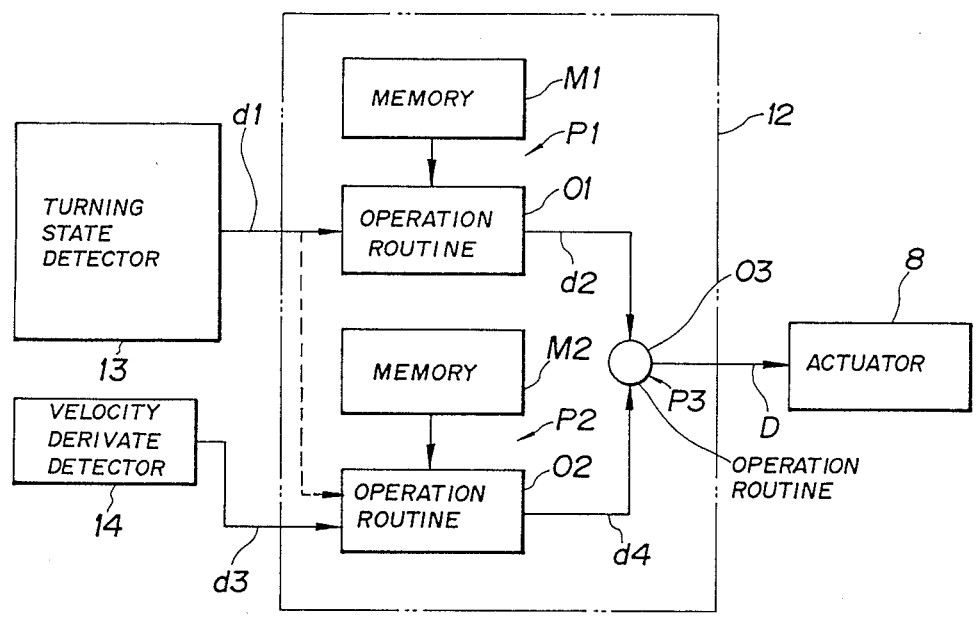
FIG. 2 is a functional block diagram of a control part of the steering system of FIG. 1.

Referring now to FIG. 2, the turning state detector 13 has detected a value Ts, reapresentative of the turning state of the vehicle, output as a detection signal $d_1$ therefrom. The signal $d_1$ is passed to a first process function $P_1$ of the computer 12, where it is processed on the basis of data on various turning states stored in a memory $M_1$, following an operation routine $O_1$, to determine a reference steering angle Ar of the rear wheels 11 corresponding to the detection signal $d_1$. Then, data on the angle Ar are given in the form of a data signal $d_2$ to be sent through a later-described third process function $P_3$ and hence, when no velocity derivative is detected, solely to the actuator 8. The reference steering angle Ar is given as a steering amount from the neutral position of the rear wheels 11, and is assigned to have a positive (+) value when it is intended to have the same direction as the front wheel steering angle Sf as represented by the state value Ts and a negative (−) value when the intended direction is opposite thereto. At the actuator 8, such data are processed, for example, through a digital to analog conversion process followed by an amplification stage, to rotate, in a motor-driving manner or the like, the shaft 8a for steering the rear wheels 11.

In FIG. 2, the velocity derivative detector 14 has detected a velocity derivative Vd output as a detection signal $d_3$ therefrom. The signal $d_3$ is passed to a second process function $P_2$ of the computer 12, where it is processed on the basis of data on various velocity derivatives stored in a memory $M_2$, following an operation routine $O_2$, to determine a corrective steering angle Ac of the rear wheels 11 corresponding to the detection signal $d_3$. Then, data on the angle Ac are given in the form of a data signal $d_4$ to be sent to the third process function $P_3$ of the computer 12. The corrective steering angle Ac is given as a correction amount for additionally correcting, in accordance with the velocity derivative Vd, the position of the rear wheels 11, as they are steered by the reference steering angle Ar following the data signal $d_2$, while the vehicle is turning, whereas the correction amount is assigned to have a positive (+) value when the vehicle is in an accelerating state and a negative (−) value in a decelerating state.

With respect to the foregoing description, as shown in FIG. 2 by broken line, the turning state detector 13 may have an output thereof passed also to the second process function $P_2$, to thereby reconfirm the turning state of the vehicle, before giving the data signal $d_4$.

At the third process function $P_3$, the data signals $d_2$ and $d_4$ are processed, following an operation routine $O_3$, to determine the rear wheel steering angle Sr by correcting the reference steering angle Ar by way of a subtraction therefrom of the corrective steering angle Ac. Then, data on the angle Sr are output in the form of the control signal D to the actuator 8. In other words, Sr=Ar−Ac and, therefore, in the case where the rear wheels 11 are steered in the same direction as the front wheels 5, then Sr=|Ar|−|Ac| when Vd>0 (accelerating state) or Sr=|Ar|+|Ac| when Vd<0 and, where they are steered in the opposite direction thereto, then Sr=−|Ar|−|Ac| when Vd>0 or Sr=−|Ar|+|Ac| when Vd<0.

Incidentally, the corrective steering angle Ac may be assigned to have a negative (−) value for Vd>0 and a positive (+) value for Vd<0, and in such case, to determine the rear wheel steering angle Sr, the reference steering angle Ac may be corrected by way of an addition thereto of the corrective steering angle Ac.

Figure 3A:
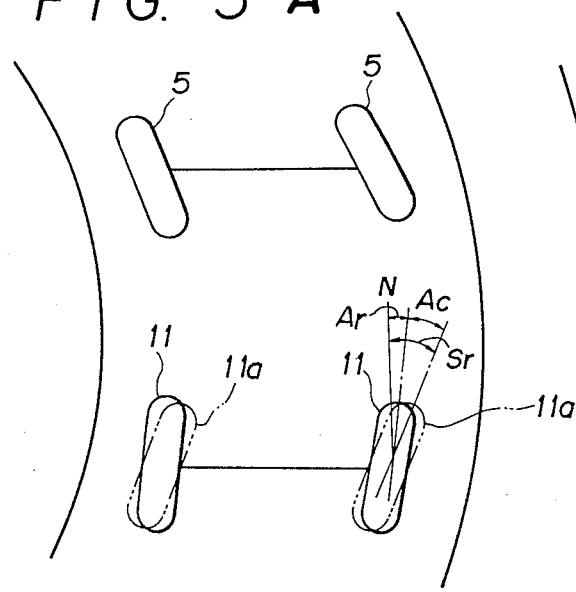
FIGS. 3A and 3B are plan views showing, for an accelerating state, the relation of steering angles between front and rear wheels being steered with the steering system of FIG. 1.
Figure 3B:
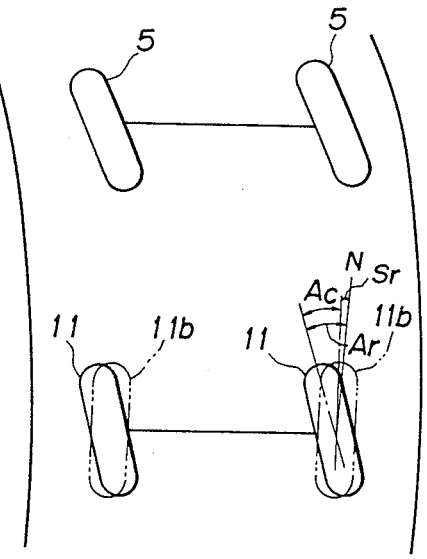

The above-described relations in the accelerating state are schematically illusrated in FIGS. 3A and 3B. FIG. 3A corresponds to the case of a negative value of the reference steering angle Ar, in which the rear wheels 11 are steered in the opposite direction to the front wheels 5, while FIG. 3B corresponds to the case of a positive value of the angle Ar, where the steering direction of the rear wheels 11 is the same as that of the front wheels 5. In FIGS. 3A and 3B, designated at reference character N is the neutral position of the rear wheel 11 at each side of the vehicle, which position corresponds to the straight travelling state of the vehicle. In FIG. 3A, the reference steering angle Ar is corrected by the corrective steering angle Ac in the opposite direction to the front wheels 5, thus resulting in a larger value of the rear wheel steering angle Sr, whereby the rear wheel 11 is steered into a position 11a more distant from the neutral position N than that by the reference steering angle Ar. On the other hand, in FIG. 3B, the reference steering angle Ar is corrected by the corrective steering angle Ac in the opposite direction to the front wheels 5, resulting this time in a smaller value of the rear wheel steering angle Sr, so that the rear wheel 11 is steered into a position 11b nearer to the neutral position N than that by the reference steering angle Ar. As shown in FIGS. 3A, 3B, the rear wheel 11 is corrected in the angle thereof in a direction which promotes the turning motion of the vehicle.

Figure 4A:
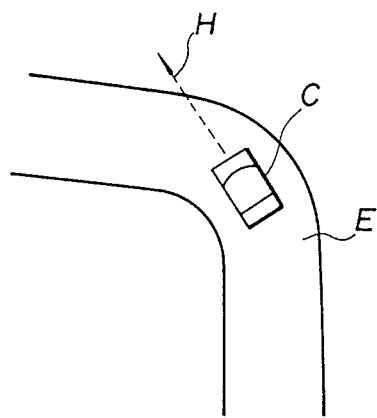
FIG. 4A is an overhead view for explaining the vision problems in the accelerating state attendent a vehicle with a conventional steering system when travelling along a curve.
Figure 4B:
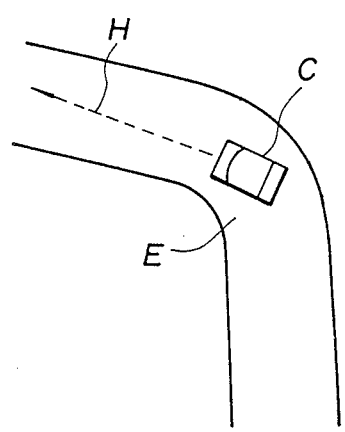
FIG. 4B is a view similar to FIG. 4A, illustrating the clearness of vision in the accelerating state attendant a vehicle with a steering system according to the invention when travelling along a curve.

As a result, as shown in FIG. 4B, when a vehicle C with a steering system according to the invention travels along, a curve E, a driver (not shown) of the vehicle C has an improved sight direction H so as to facilitate obtaining a clear front view around the curve E in comparison with the case of a conventional steering system provided in the vehicle C, in which, as shown in FIG. 4A, the sight direction H affords only a blind front view over the curve E.

Figure 5A:
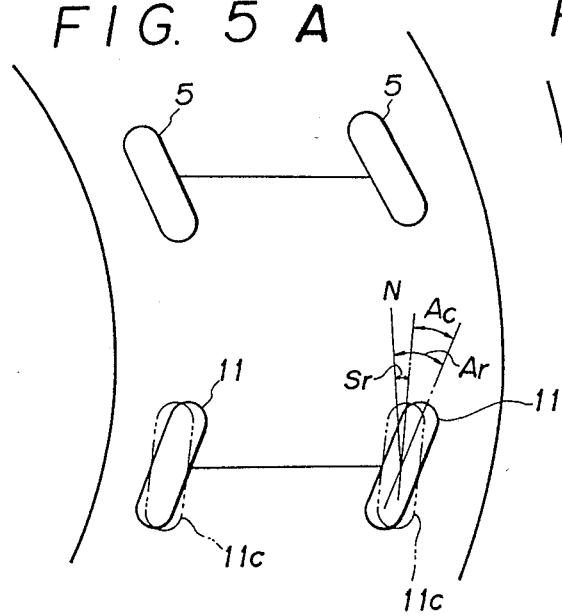
FIGS. 5A and 5B are plan views showing, for a decelerating state, the relation of steering angles between front and rear wheels being steered with the steering system of FIG. 1.
Figure 5B:
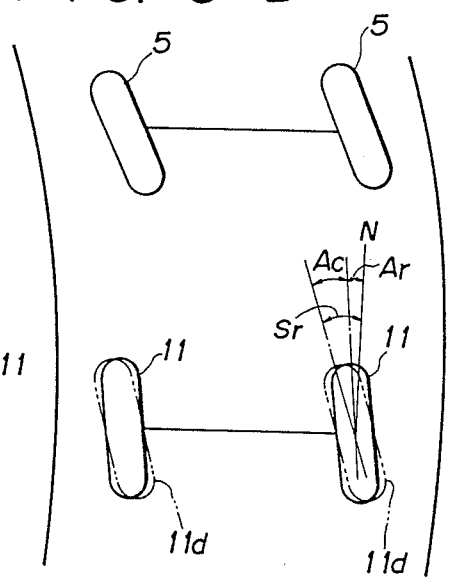

On the other hand, for the decelerating state, the before-described relations are schematically shown in FIGS. 5A and 5B. FIG. 5A corresponds to the case of a negative value of the reference steering angle Ar, in which the rear wheels 11 are steered in the opposite direction to the front wheels 5, while FIG. 5B corresponds to the case of a positive value of the angle Ar, where the steering direction of the rear wheels 11 is the same as that of the front wheels 5. In FIGS. 5A and 5B, designated at reference character N is the neutral position of the rear wheel 11 at the right side, which position corresponds to the straight travelling state of the vehicle. In FIG. 5A, the reference steering angle Ar is corrected by the corrective steering angle Ac in the same direction as the front wheels 5, thus resulting in a smaller value of the rear wheel steering angle Sr, whereby the rear wheel 11 is steered into a position 11c nearer to the neutral position N than that by the reference steering angle Ar. On the other hand, in FIG. 5B, the reference steering angle Ar is corrected by the corrective steering angle Ac in the same direction as the front wheels 5, resulting this time in a larger value of the rear wheel Steering angle Sr, so that the rear wheel 11 is steered into a position 11d more distant from the neutral position N than that by the reference steering angle Ar. As shown in FIGS. 5A, 5B, the rear wheel 11 is corrected in the steered angle in a direction which opposes the turning motion of the vehicle, thus producing an increased lateral force to the rear wheel 11, whereby the fish-tailing motion is favorably prevented.

Figure 6:
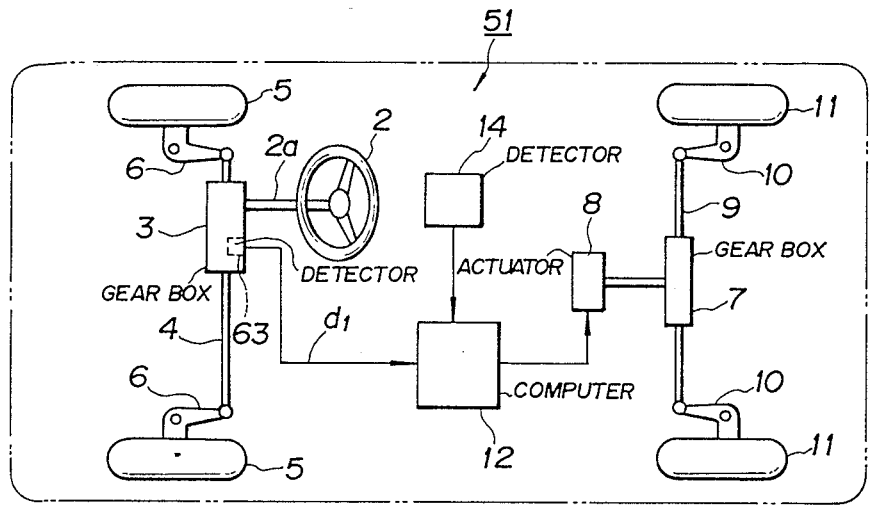
FIG. 6 is a plan view schematically showing the constitution of a steering system for vehicles according to a modified example of the above embodiment.

There will be described below a steering system 51 according to a modified example of the foregoing embodiment, with reference to FIG. 6. The modified example differs from the foregoing embodiment in that, as a turning state representative value Ts of a vehicle, there is employed a front wheel steering angle Sf detected by a front wheel steering angle detector 63 provided in a gear box 3 adapted for the steering of front wheels 5 of the vehicle, and that the front wheel steering angle Sf is input as a detection signal $d_1$ to a computer 12.

In the foregoing embodiment, the velocity derivative detector 14 may comprise an acceleration sensor for detecting the velocity derivative Vd only in an accelerating state and/or a deceleration sensor for detecting the velocity derivative Vd only in a decelerating state. Moreover, there may be employed as the acceleration sensor any suitable element such as an acceleration pedal operation sensor for detecting an accelerating operation of a driver of the vehicle and further, as the deceleration sensor, any suitable element such as a braking operation sensor for detecting a decelerating operation of the driver. Furthermore, the data signal $d_4$ representing the corrective steering angle Ac may be given only when the velocity derivative Vd is in an accelerating state or in a decelerating state.

Still more, although the angles Ar and Ac are employed to indicate a reference steering quantity and a corrective steering quantity of the rear wheels 11, respectively, they may be substituted by any other suitable parameter such as a steered angle ratio of the rear wheels 11 to the front wheels 5. Yet more, the corrective steering quantity may be given in the form of a correction coefficient relative to the reference steering quantity.

In addition, although a computer is mounted on the vehicle as means for processing the detection signals $d_1$, $d_3$ to obtain the control signal D, a similar effect may be achieved by use of an electric circuit.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. A steering system for a vehicle having a front wheel (5) and a rear wheel (11), comprising:
   a front wheel steering mechanism (1a) for steering said front wheel at an angle (Sf) in accordance with a steering operation of a driver of said vehicle;
   a rear wheel steering mechanism (1b) for steering said rear wheel; and said rear wheel steering mechanism including:
   first detection means (13) for detecting a turning, state (Ts) of said vehicle;
   first process means ($P_1$) for processing a detection signal ($d_1$) of said first detecting means to provide steering data ($d_2$) for said rear wheel corresponding to said turning state;
   second detection means (14) for detecting a velocity derivative (Vd) of said vehicle;
   second process means ($P_2$) for processing a detection signal ($d_3$) of at least said second detection means to provide correction data ($d_4$) for the steering of said rear wheel;
   said correction data representing a correction amount (|Ac|) and a correction direction both corresponding to said velocity derivative;
   actuation means (8) for actuating said rear wheel at an angle (Sr) in accordance with both said steering data and said correction data; and
   said steering data includes a reference steering amount (|Ar|) of said rear wheel, the direction of said reference steering amount being dependent on whether the rear wheel is steered in the same or opposite direction as the front wheel.

2. A steering system according to claim 1, wherein:
   said correction direction of the steering of said rear wheel is given as a direction which promotes the turning of said vehicle when said velocity derivative is in an accelerating state.

3. A steering system according to claim 1, wherein:
   said correction direction of the steering of said rear wheel is given as a direction which opposes the turning of said vehicle when said velocity derivative is in a decelerating state.

4. A steering system according to claim 1, wherein:
   said rear wheel steering mechanism includes third process means ($P_3$) for collecting said steering data and said correction data to present to said actuation means a control signal (D) representing said angle at which said rear wheel is actuated.

* * * * *

UNITED STATES PATENT AND TRADEMARK OFFICE
CERTIFICATE OF CORRECTION

PATENT NO. : 4,971,175

DATED : November 20, 1990

INVENTOR(S) : Hamada et al.

It is certified that error appears in the above-identified patent and that said Letters Patent is hereby corrected as shown below:

Column 2, line 29, change "attendent" to --attendant--;
         line 61, after "travelling" insert --state--.

Column 3, line 48, correct the spelling of "representative".

Column 6, line 31 (Claim 1, line 9), delete the comma.

Signed and Sealed this

Twenty-first Day of April, 1992

*Attest:*

HARRY F. MANBECK, JR.

*Attesting Officer*      *Commissioner of Patents and Trademarks*